United States Patent [19]
Elings et al.

[11] Patent Number: 6,008,489
[45] Date of Patent: Dec. 28, 1999

[54] METHOD FOR IMPROVING THE OPERATION OF OSCILLATING MODE ATOMIC FORCE MICROSCOPES

[75] Inventors: Virgil B. Elings; Sergei Magonov, both of Santa Barbara, Calif.

[73] Assignee: Digital Instruments, Santa Barbara, Calif.

[21] Appl. No.: 08/984,058

[22] Filed: Dec. 3, 1997

[51] Int. Cl.$^6$ .................................................. G01B 7/34
[52] U.S. Cl. .................... 250/234; 250/306; 250/307; 73/105
[58] Field of Search .................... 250/306, 307, 250/234, 235, 559.06, 559.23, 559.22; 73/105, 579

[56] References Cited

U.S. PATENT DOCUMENTS

| | | | |
|---|---|---|---|
| Re. 34,489 | 12/1993 | Hansma et al. | 250/306 |
| 5,226,801 | 7/1993 | Cobile | 417/231 |
| 5,229,606 | 7/1993 | Elings et al. | 250/307 |
| 5,254,854 | 10/1993 | Betzig . | |
| 5,266,801 | 11/1993 | Elings et al. . | |
| 5,308,974 | 5/1994 | Elings et al. | 250/234 |
| 5,412,980 | 5/1995 | Elings et al. | 73/105 |
| 5,415,027 | 5/1995 | Elings et al. | 250/307 |
| 5,436,448 | 7/1995 | Hosaka et al. | 250/307 |
| 5,519,212 | 5/1996 | Elings et al. | 250/234 |
| 5,625,142 | 4/1997 | Gamble | 73/105 |
| 5,670,712 | 9/1997 | Cleveland et al. | 73/105 |

OTHER PUBLICATIONS

Atomic Force Microsope–Force Mapping and Profiling on a Sub 100–ÅScale, Y. Martin et al., J. of Appl. Phys. 61(10), May 15, 1987.

AFM Study of Thermotropic Structural Transitions of Poly-(diethylsiloxane), S.N Magonov et al., Polymer, vol. 38, No. 2, pp. 297–307, Mar. 1997.

Phase Imaging and Stiffness in Tapping–Mode Atomic Force Microscopy S.N. Magonov et al., Surface Science Letters, 1997, (no month).

Tapping–Mode Atomic Force Microscopy Study of the Near–Surface Composition of a Styrene–Butadiene–Styrene Triblock Copolymer Film, S.N. Magonov et al., Surface Science Letters, 1997, (no month).

*Primary Examiner*—John R. Lee
*Attorney, Agent, or Firm*—Nilles & Nilles S.C.

[57] ABSTRACT

The oscillation parameters of a probe of an atomic force microscope (AFM) typically vary over time. This variation can cause problems during either 1) scanning or measurement functions in which the probe's operative state is one in which oscillatory measurements are taken or 2) the process of bringing the tip to the sample to begin measurement, commonly referred to as engaging the probe, in which the probe's operative state is one in which the probe is about to move into its measuring position. These problems can be eliminated during either process by measuring changes in a parameter or parameters of probe oscillation, determining what changes are not due to probe-sample interaction, and correcting the oscillation parameters accordingly. This may be accomplished in two ways, the first with the probe out of intermittent contact with the sample, and the second during scanning. The first comprises placing the probe in a reference or free oscillation state in which the probe tip oscillates at a free oscillation amplitude $A_o$, measuring $A_o$ and adjusting it if necessary, and then returning the probe to its operative state. The probe can be placed in its reference state by varying the spacing between the probe and the sample, by altering probe drive parameters, or by any other suitable technique. The second comprises measuring the phase of the probe oscillation during scanning and adjusting the phase to a desired range.

58 Claims, 5 Drawing Sheets

METHOD FOR IMPROVING THE OPERATION OF OSCILLATING MODE ATOMIC FORCE MICROSCOPES

BACKGROUND OF THE INVENTION

1. Field of the Invention

This invention is in the field of atomic force microscopy, specifically relating to atomic force microscopes (AFMs) operating with the probe in an oscillating mode and a method of improving the operation in an oscillating mode.

2. Description of the Related Art

Atomic Force Microscopes (AFMs) operate by scanning a probe over a surface using a high resolution three axis scanner, usually creating relative motion between the probe and the sample while measuring the topography or some other surface property, as described in Hansma et al. in U.S. Pat. No. RE34,489. AFMs typically include a probe, usually a very small lever fixed at one end with a sharp probe tip attached to the opposite, or free, end. The probe tip is brought very near to or into contact with a surface to be examined, and the deflection of the lever in response to the tip's interaction with the surface is measured with an extremely sensitive deflection detector, often an optical lever system such as described by Hansma et al, or some other deflection detector such as a strain gauge, capacitance sensor, or others well known in the art. Using piezoelectric scanners, optical lever deflection detectors, and very small probe lever arms fabricated using photolithographic techniques, AFMs can obtain resolution down to the atomic level on a wide variety of insulating or conductive surfaces in air, liquid or vacuum. Because of their resolution and versatility, AFMs are important measurement devices in a diversity of fields ranging from semiconductor manufacturing to biological research.

Early AFMs operated in what is commonly referred to as contact mode by scanning the tip in contact with the surface, thereby causing the lever to bend in response to the sample features. Typically, the output of the deflection detector was used as an error signal to a feedback loop which servoed the vertical axis scanner up or down to maintain a constant preset lever deflection as the tip was scanned laterally over the sample surface topography. The servo signal versus lateral position created a topographic map (or image) of the sample surface. Thus, the AFM maintained a constant lever deflection and accordingly a constant force on the sample surface during lateral scanning. Using very small, microfabricated levers, the tip-sample force in contact mode AFMs could be maintained at force levels sufficiently small to allow imaging of biological substances, and in some cases achieve atomic resolution. In addition, an AFM can measure very small force interactions between the tip and sample, and by suitably preparing the probe, such as coating it with an appropriate material, other parameters such as magnetic or electric fields may be measured with an AFM.

However, for many samples, particularly in ambient atmospheric environment, the fluid layer found on all surfaces, along with other factors affecting the tip-sample interaction, may cause the probe tip to stick to the sample surface during contact mode scanning. This sticking may degrade the image quality or damage the sample surface or the probe tip. This effect may be reduced by immersing the probe and sample in liquid or vacuum, but such operation is not convenient for many applications.

Contact mode is basically a DC measurement. Other modes of operation have been developed in which the lever (or another probe configuration) is oscillated. At this time, three oscillating probe modes are common in AFMs, non-contact (Martin, et al, J. Applied Physics 61(10) May 15, 1987), shear force (U.S. Pat. No. 5,254,854 by Betzig et al), and Tapping™ or TappingMode™. (Tapping and TappingMode are trademarks of Digital Instruments, Inc.). U.S. patents relating to Tapping and TappingMode include U.S. Pat. Nos. 5,266,801, 5,412,980 and 5,519,212, by Elings et al., all of which are hereby incorporated by reference. These modes, particularly TappingMode, have become extremely commercially successful. This invention is directed at improving the operation of TappingMode AFM, but may also be directed to other oscillating AFM modes of operation.

In oscillating AFM operation, the probe is oscillated, typically at the probe's resonant frequency, and brought near the sample surface. In all oscillation modes, the probe is first oscillated at a distance sufficient from the sample to prevent direct probe-sample interaction, referred to as the free oscillation. The effect of the surface on the free oscillation parameters of the probe is used as the signal of interest, either as an error signal for a feedback loop or as direct measure of tip-sample force interaction. For example, many AFMs employ a feedback loop that uses changes in the oscillation amplitude due to interaction with the surface to maintain that amplitude substantially constant. In non-contact and TappingMode operations, the free oscillation is substantially perpendicular to the plane of the sample surface, while in shear force measurement operation, the free oscillation is essentially parallel with the plane of the sample surface. Non-contact operation relies on non-contact force gradients to affect the resonant properties of the probe in a measurable fashion, while TappingMode operation relies on the far more robust interaction of actually striking the surface and losing some energy to the surface. Mixed modes such as Tapping for topography measurements and non-contact for other force measurements, i.e., magnetic field, are commonly used (see, e.g., U.S. Pat. No. 5,308,974 by Elings et al.).

Hence, the invention will be discussed primarily in terms of TappingMode operation, although it should be understood that the teachings of the invention apply equally well to other oscillating modes.

Referring to FIG. 1, typically for TappingMode operation, a probe 3 having a tip 6 is attached to an oscillator 2 which can drive the probe 3 appropriately, usually at or near the probe's resonant frequency. An electronic signal is applied from an AC signal source 1, under control of an AFM control/computer 7, to the oscillator 2 to drive the probe tip 6 to oscillate at a free oscillation amplitude $A_o$. $A_o$ can be varied over a broad range, i.e. from hundreds of nanometers to the nanometer scale, the latter is typically used for non-contact force measurements. Practically, for light interaction with a sample surface during imaging, $A_o$ should be as small as possible, but large enough to prevent the tip from sticking to the sample surface 5 due to capillary and/or other adhesive forces. The probe 3 can also be driven toward and away from the sample 5 using a suitable actuator 8 controlled by the computer 7. As shown in FIG. 2, when the actuator 8 is energized to move the probe 3 near the surface and the tip 6 taps the surface of sample 5 at the bottom of each oscillation cycle, the probe tip oscillation amplitude decreases from $A_o$ to $A_s$. The probe motion could also be controlled magnetically as described in U.S. Pat. No. 5,670,712 by Cleveland et al.

A preset value of $A_s$ is typically used as a setpoint for the vertical feedback servo function for the actuator 8, so the Tapping AFM scans at a predetermined decrease from the free amplitude $A_o$. Since the probe tip 6 only touches the sample 5 for a short interval at the bottom of each cycle, lateral forces during scanning are virtually eliminated, thereby overcoming the major limitation of contact mode AFMs. For the majority of samples, $A_s$ can be significantly smaller than $A_o$, often as much as 50% smaller, with no significant sample or tip damage. TappingMode operation is therefore usually immune to small system variations. TappingMode operation is capable of providing stable operation with good image quality and has become the most commercially successful AFM mode.

For some samples however, such as very soft biological samples or large polysilicon grains used in integrated circuit production, even with the lateral forces eliminated, the energy lost to the Tapping action must be extremely small or the tip 6 and/or the sample 5 experience unacceptable wear. Similarly, it is important to limit the force exerted on soft samples to avoid elastic deformation of the sample so that a topographical image accurately represents true sample topography. For these samples, it is preferable that a "light Tapping" mode be employed, where A, is very slightly different than $A_o$. As may be 95% or even a greater percentage of $A_o$ for "light Tapping", because the tip must continue to tap the sample surface but must remain within a small percentage of $A_o$. Light Tapping mode, therefore, requires extremely stable oscillation parameters or feedback control to prevent deterioration of the tip-sample interaction.

Holding oscillation parameters (such as amplitude, frequency, and phase) sufficiently stable to allow for light Tapping is difficult to achieve. Even if the electronic drive signal and oscillator outputs are perfectly stable, the actual free oscillation amplitude may vary more than acceptable for light Tapping. Particularly when a new probe is installed in an AFM, the free oscillation may take as much as an hour to stabilize within the 3–5% oscillation amplitude difference range necessary for light Tapping. This may be due to mechanical relaxation of the probe lever itself, settling of the probe-oscillator interface, drift in the probe clamping force, or some other mechanism that is difficult to correct. Thus, when light Tapping parameters are the criteria being used for scanning during settling, there are potential problems; the free oscillation $A_o$ may increase during measurement which will result in increased Tapping forces, or $A_o$ may decrease during measurement which will cause the feedback loop for controlling the actuator 8 to allow the tip 6 to lose intermittent contact with the sample surface, neither of which is acceptable. When the oscillation finally stabilizes, the light Tapping achieves high resolution imaging due to a minimal tip-sample contact area. Tip lifetime is also extended, even on the hardest samples, like ceramics or silicon wafers. However, imaging during the settling time typically results in too many bad scans or excessive tip and/or sample wear. This is a problem because there is often insufficient time to wait for the tip to settle.

Because it is important that the free oscillation parameters remain extremely stable during surface measurement, it is also desirable to isolate the effect of tip interaction with the sample surface from the background effects of the probe's proximity to the surface of the sample. Such background effects may not be present, but often are. One such background effect is discussed by Serry et al. in "Air-Damping of Resonant AFM Micro-Cantilevers in the Presence of a Nearby Surface" and is known as "squeeze film damping." Squeeze film damping may occur if air is located between the probe and the sample surface, in which case the air generally will be compressed by the oscillation of the probe such that the probe's resonant frequency will be reduced or other parameters changed. Similarly, if the probe and sample were electrostatically, magnetically or otherwise affecting each other during probe oscillation, such interplay could affect the oscillation parameters such that the free oscillation changes with proximity to the sample, Thus, a variety of effects may cause the oscillation parameters to shift from the desired preset conditions, which can detract from light Tapping operation.

OBJECTS AND SUMMARY OF THE INVENTION

It is therefore an object of this invention to improve interaction stability for oscillating mode AFMs.

It is a further object of this invention to achieve practical light TappingMode AFM operation, including both scanning and sample approach.

The invention achieves the foregoing objects by selectively monitoring the free oscillation parameters during measurement scanning, and approach functions to assure that any change in these parameters is detected and operation is corrected sufficiently often to achieve high resolution and minimize tip and/or sample wear by maintaining a desired relationship between the free air and operating probe oscillation parameters.

The invention achieves these goals using either of two methods. In the first, the invention works by, at selected times, 1) placing the probe in a reference or free oscillating state, e.g., by removing the probe sufficiently far from the surface to observe the free oscillation amplitude, 2) resetting one or more parameters appropriately, and 3) then placing the tip back into an operative state, e.g., one in which the probe is in intermittent contact with the surface. In the second case, the goals are achieved by, 1) monitoring the oscillation parameters during scanning and, 2) at selected times, resetting one or more parameters appropriately.

In the preferred embodiment of the first case, the method includes the following: first, measuring the sample by placing the probe in an operative state in which the probe interacts with the sample while the probe oscillates; second, placing the probe in a free oscillation state so that it is not interacting with the sample in a particular way (this free oscillation state either may or may not be one in which probe oscillation is affected by incidental probe-sample interaction); and third, while it is in such a free oscillation state, measuring a parameter of probe free oscillation and determining whether or not the measured magnitude of that parameter differs from a predetermined or desired magnitude. Finally, at least one parameter of probe oscillation is then adjusted if the measured magnitude of the parameter of probe free oscillation differs from the predetermined or desired magnitude.

Thus, in the preferred embodiment, the probe may be placed in a free oscillation state by moving an element comprising at least one of the probe and the sample to a reference position such that the probe is allowed to oscillate in the free oscillation state. This embodiment relies on an increase in the relative distance between the probe and the sample.

Alternatively, a free oscillation state may be created by driving the probe to oscillate the probe tip at a second drive signal amplitude $V_1$ which is less than a first drive signal amplitude $V_o$ and simultaneously allowing the probe to cease intermittent contact with the sample. The probe may be allowed to cease intermittent contact by reducing the feedback gains commonly used in the art to maintain such intermittent contact. The probe will then begin to oscillate in the free oscillation state at a probe tip amplitude $A_1$. In this embodiment, the next step comprises determining whether or not the measured free oscillation amplitude differs from a desired, or predetermined, free oscillation amplitude $A_1$. The adjusting step comprises adjusting the second drive signal amplitude $V_1$, and then changing the first drive signal amplitude $V_o$ in the same proportion. During or after the adjustment, the probe may be returned to the operative state by reestablishing intermittent contact by applying the first drive signal $V_o$ to drive the oscillation.

In an embodiment of the second case, change in the oscillation parameters is detected by periodically measuring the phase lag between the tip and the tip oscillator during scanning. Then, any change is corrected for by adjusting the phase lag to the desired value by varying the drive frequency of the AC signal source, or other parameters of oscillation. This embodiment has the advantage of being performed during the scanning procedure, and so does not require interruption of scanning, as do the other embodiments.

Other objects, features and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

As observed in actual practice, the oscillation parameters of a probe typically will vary over time. This variation can cause problems either 1) during scanning or measurement functions in which the probe's operative state is one in which oscillatory measurements are taken, or, 2) during the process of bringing the tip to the sample to begin measurement, commonly referred to as engaging the probe, in which the probe's operative state is one in which the probe is about to move into its measuring position. The first embodiment of the invention involves placing the probe in a reference state in which the probe tip oscillates at a free oscillation amplitude $A_o$, measuring $A_o$, and adjusting it if necessary, and then returning the probe to its operative state. The invention as applied to scanning will be described first.

Figure 1:
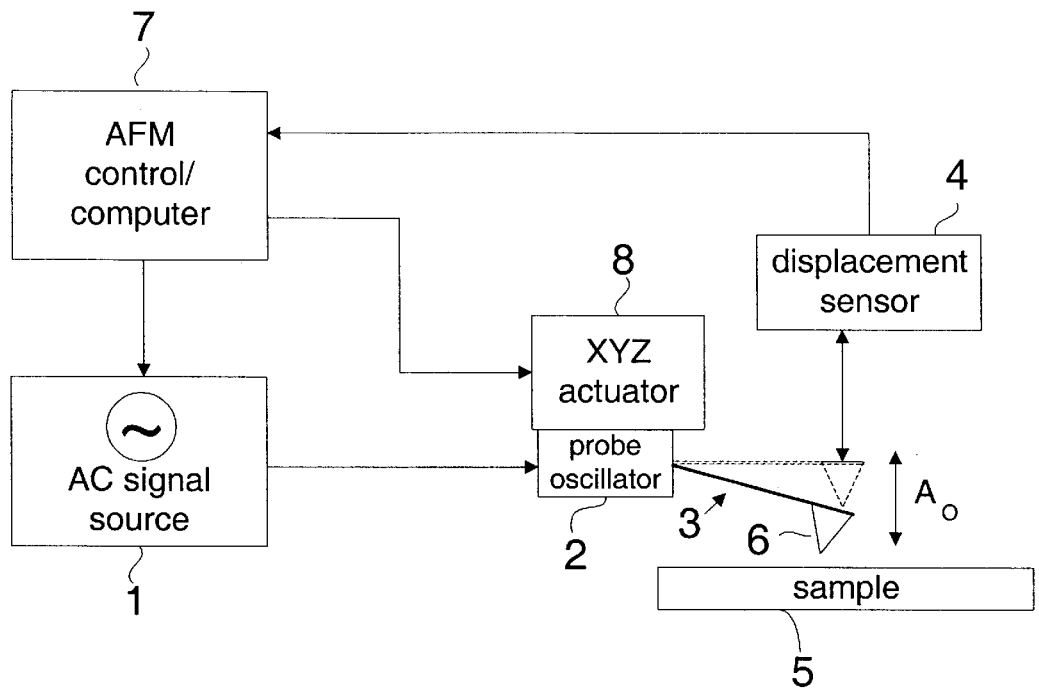
FIG. 1 is a schematic representation of a portion of an AFM with its probe undergoing free oscillation.
Figure 2:
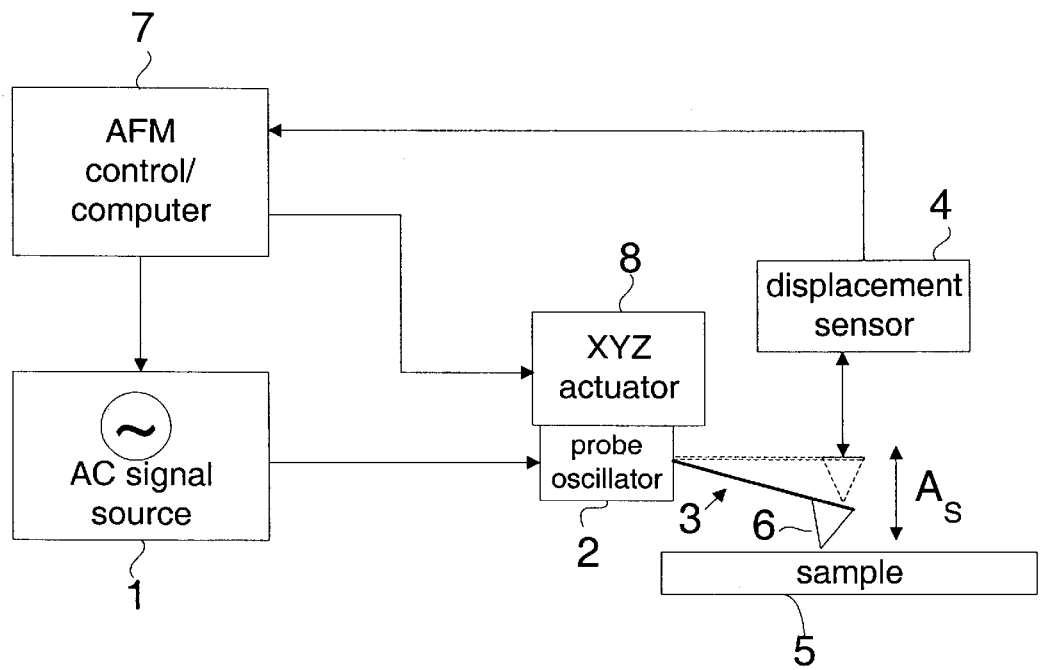
FIG. 2 is a schematic representation of the AFM portion of FIG. 1 in which the probe tip taps the sample surface.
Figure 3:
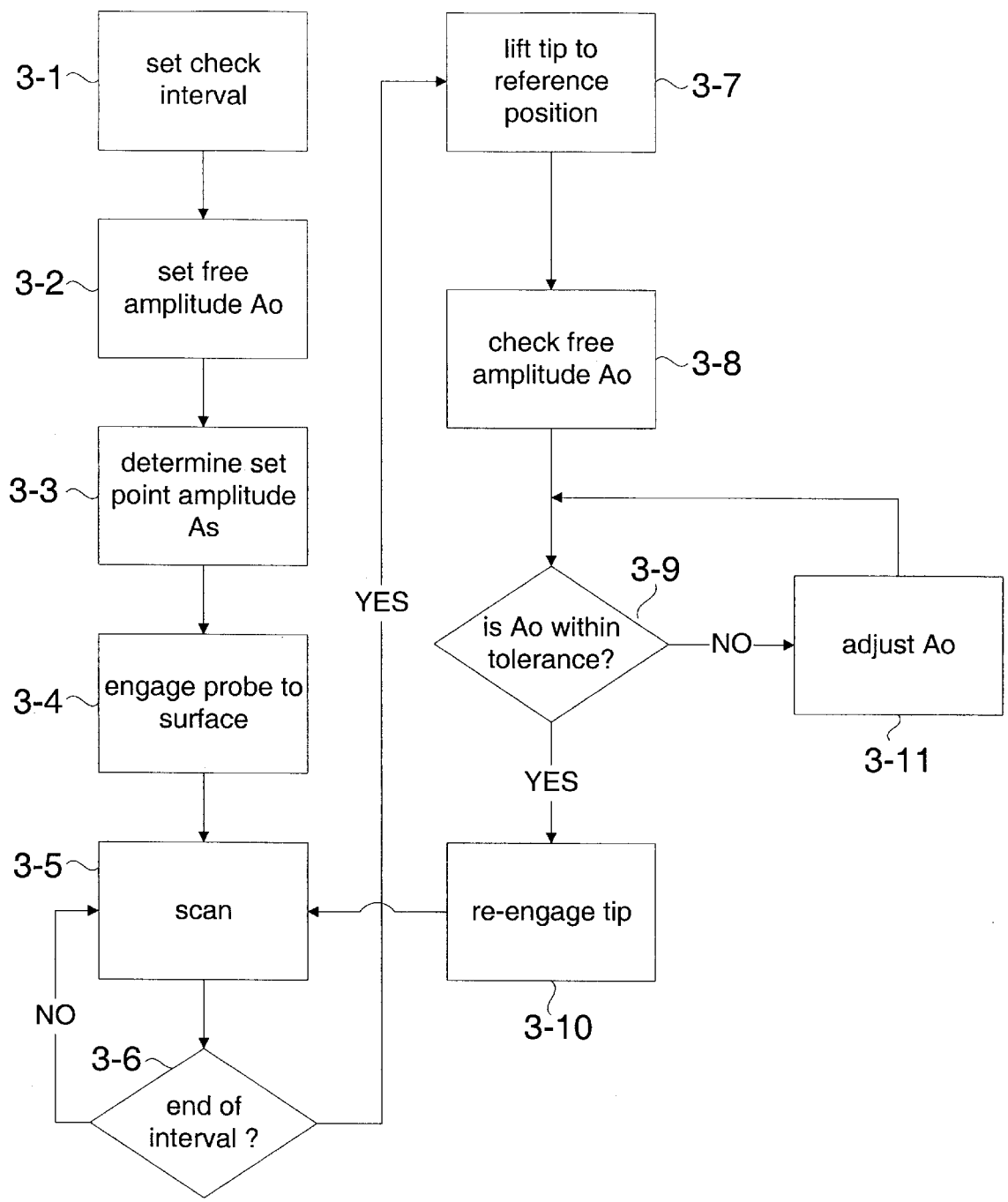
FIG. 3 is a flow chart representing an embodiment of the invention as applied to a scanning procedure.

Referring to FIGS. 1 and 2 and to the flow chart of FIG. 3, when setting up the AFM to operate in light TappingMode, the operator must first select the oscillation parameters of the probe 3 (steps 3-1 through 3-3 of FIG. 3). For scanning a sample 5 under controlled, stable interaction (i.e. resistant to deterioration), these parameters are typically the oscillation frequency, the free oscillation amplitude $A_o$, and the setpoint oscillation amplitude $A_s$ (i.e., the desired oscillation amplitude when the probe 3 is engaged, which is usually used as the setpoint for the vertical servo system or actuator 8). In the preferred embodiment, the frequency is not monitored after initial set-up. The resonant frequency could have been found and set automatically by the instrument, a common feature on currently-available instruments. For light Tapping, $A_s$ will typically be set within 10%, often within 5%, of $A_o$, and $A_o$ will be set small enough to allow for the imposition of light forces on the sample but large enough for stable operation. The setting of $A_o$ is usually based on experience in operating TappingMode AFMs. As is known in the art, all or nearly all AFMs are computer controlled instruments with the scanners and other devices directed from a controller such as the computer 7. Thus, because those skilled in the art are aware of them, the details of AFM functionality are not specifically part of the invention and will not be described in further detail. It should also be understood that $A_o$ and other oscillation parameters may in actual practice be set automatically under computer control for intended operation once the proper recipe has been determined for a certain sample and measurement. Other parameters such as scan size are common to AFM operation and also do not form an integral part of this invention and will not be described in detail.

After the operator has selected the oscillation parameters as well as the other parameters (steps 3-1 through 3-3), the operator directs the AFM to engage the probe 3, preferably using the computer 7 to transmit the desired command signals (step 3-4). This action consists of the probe 3 being made to approach the sample surface, using the actuator 8 or any other suitable device known to those skilled in the art, until the oscillation amplitude decreases from $A_o$ to $A_s$. Scanning or measurement of the surface commences at this point (step 3-5), usually by driving the probe 3 laterally across the surface of the sample 5 in a raster-scan pattern and by using $A_s$ as feedback control for the XYZ actuator 8. A novel feature is the following. During measurement, and at preselected intervals (step 3-6), the AFM, under control of the computer 7, will drive the actuator 8 to lift the probe 3 to a reference position to bring the oscillation amplitude back to $A_o$ (step 3-7). If near-surface effects and/or other background effects are present and are to be taken into account, the reference position may if desired be located very near the measuring position so that these background effects can be taken into account when measuring $A_o$. This type of compensation will often occur in any case because the probe 3 will be lifted minimally in the interest of speed. The term "free oscillation" as used herein therefore should be construed to mean oscillation without direct or measuring interaction with the sample. This oscillation may comprise either 1) oscillation in which the probe is not subject to direct probe-sample interaction which is the objective of sample measurement and also is not subject to near-surface effects and other background effects characterizeable as "incidental probe-sample interaction", or 2) oscillation in which the probe is not subject to direct, or measuring, probe-sample interaction which is the objective of sample measurement, but is subject to incidental probe-sample interaction. The direct or measuring interaction may comprise interaction in which the probe actually touches the sample, as in Tapping, light Tapping, and contact modes, or interaction in which the probe does not actually touch the sample, such as in magnetic force microscopy, electric force microscopy, and others.

For the preferred embodiment, the inventors have found that lifting the probe 3 on the order of 10 nanometers, but sometimes less depending on various factors, is sufficient to bring the probe 3 back to free oscillation condition, and after adjustment bringing it down by the same amount re-engages the tip 6 and can be done so that it does not cause a break in the image. The amount of lift required will depend on user preference and must often be determined experimentally for each sample or type of sample. It should be noted that some slight deviations from $A_o$ (or another parameter of interest) will usually be tolerated so long as these differences are within an acceptable threshold range, as discussed above in reference to FIG. 3.

Next, while the probe 3 is in the reference position, the amplitude $A_o$ is detected (step 3-8) using a deflection detector such as a displacement sensor 4. $A_o$ is checked to make certain it is within predefined tolerances (step 3-9), and if not $A_o$ is then adjusted, preferably by adjusting the drive voltage to the oscillator 2, such that any variation from the original setting is corrected by adjusting the power supply to the probe oscillator 2 (step 3-11) to adjust the drive amplitude. Once $A_o$ is within tolerance, the tip is reengaged (step 3-10) and scanning continues. $A_o$ may also be adjusted by adjusting drive frequency. It should be noted that some slight deviations from $A_o$ (or another parameter of interest) will usually be tolerated so long as these differences are within an acceptable threshold range. References herein to detecting differences and adjusting parameters to eliminate them or otherwise reacting to them therefore are to be construed as to detecting and/or reacting to differences that exceed desired thresholds. This lift and adjust procedure can take place on any interval up to and including once per each measurement data point. The preferred embodiment is to perform this function once per scan line (for a raster image) during the turn-around at the end of each line. Although the preferred embodiment is to reset $A_o$, it should be understood that the desired parametric interactive relationship between the probe tip 6 and the sample 5 surface could instead be maintained by adjusting the value intended for $A_s$, or (for the typical case of near resonant operation) by adjusting the drive frequency. Any adjustment combination of these or other parameters that maintains the desired light Tapping parameter relationship with the resultant operational stability would be effective. The key is to put the system back into the free oscillation condition to check for changes in a controlled, recoverable manner near the sample surface so that data collection is not substantially interrupted. In the implementation currently operating, the lift and reset function takes less than 10 milliseconds out of the approximately one second period of a scan line operation.

It should be noted that the invention applies equally well to non-contact, shear force, and other microscopes which operate in oscillating mode and which would also benefit from checking the free oscillation stability during measurement. When considered in a broader aspect taking these other applications into account, this embodiment of the invention can be characterized as 1) taking the probe out of its operative, measuring state and placing it in its reference state, 2) measuring free probe oscillation (as the term "free probe oscillation" is defined above) while the probe is in its reference state and adjusting the free probe oscillation, or setpoint, if necessary, and then 3) returning the probe to its operative state.

Figure 4:
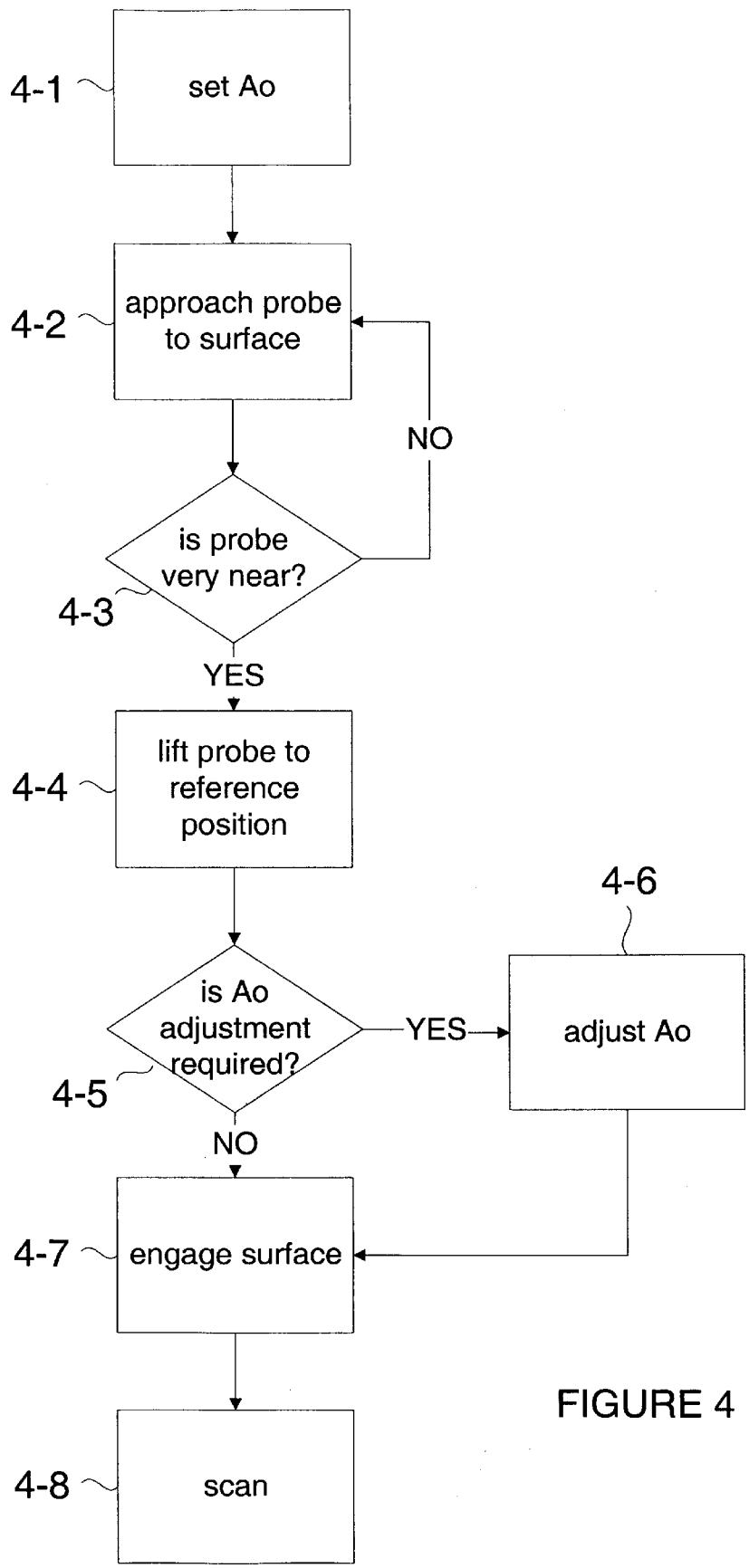
FIG. 4 is a flow chart representing an embodiment of the invention as applied to a tip-sample approach procedure.

Another AFM function where the oscillation stability is a major problem is the engage process. As known in the art, the operation of driving the probe 3 to approach the sample 5 surface has to be done sufficiently slowly that the AFM has time to detect the setpoint condition, i.e. a preset oscillation amplitude, and to initiate scanning without driving the probe tip 6 into the sample 5 surface destructively. This allows for plenty of time for the mechanical stability of probe oscillation to change due to mechanical effects or as the probe gets near the surface due to squeeze-film or other damping. Also, other near-surface effects such as a fluid layer, an electrostatic field, or an electromagnetic field may affect the oscillation parameters in such a way that the light Tapping relationship is affected. Thus, as shown in FIG. 4, the invention may be applied to the engage process to account for these near-surface effects. It should be noted that only the steps as applied to the engage process are shown in FIG. 4, but typically the scan steps would also be used in combination.

As shown in FIG. 4, after $A_o$ is determined (step 4-1), the probe 3 is driven by the actuator 8 to approach the surface (step 4-2) of the sample 5. As is known in the art, most AFMs employ techniques in the engage process to determine when the probe 3 is near the surface so that the AFM may react to the surface. For instance, the approach operation may be performed at high speed to save time until the probe 3 is near the surface, and then slowed down when proximity to the surface is detected so that the system will have time to establish the setpoint without driving the probe tip 6 into the sample surface. The mechanisms used to detect surface proximity usually rely on a slight decrease in $A_o$ due to surface proximity and are not part of this invention. The novel part of FIG. 4 is that instead of continuing to drive the probe 3 down to its full engage position, the AFM will instead 1) stop at an approach position located very near to (on the order of a few nanometers from) the engage or scanning position (step 4-3) and then 2) pull the probe 3 back up to a reference position as described above in connection with the scanning case (step 4-4). If squeeze-film damping or other background effects are present, the reference position of the probe 3 preferably (but not necessarily) is one in which the probe 3 still will be affected by those effects so that its oscillation is affected by incidental tip-sample interaction. The next step is to check $A_o$ (step 4-5). If $A_o$ needs adjustment, it is corrected (step 4-6) e.g., by adjusting the drive voltage for the oscillator 2 as described above. The engage operation then is continued and completed (step 4-7). Then, scanning begins (step 4-8). In short, a check of the actual setting of $A_o$ is performed, preferably at a location which is close enough to the surface to correct for any background effects that could change the desired tapping parameters and including those caused by proximity to the surface itself. This monitoring and adjustment prevents the tip 6 from engaging the sample surface at a much higher Tapping force than intended and damaging the sample or wearing the tip 6 out before scanning even commences.

In the above examples, the probe 3 is placed in its reference state in which free oscillation (as the term "free oscillation" is defined above) is obtained by increasing the relative distance between the probe 3 and sample 5, preferably by lifting the probe 3 away from the sample 5. However, other parameters of AFM operation could be altered to place the probe 3 in its free oscillation reference state.

Figure 5:
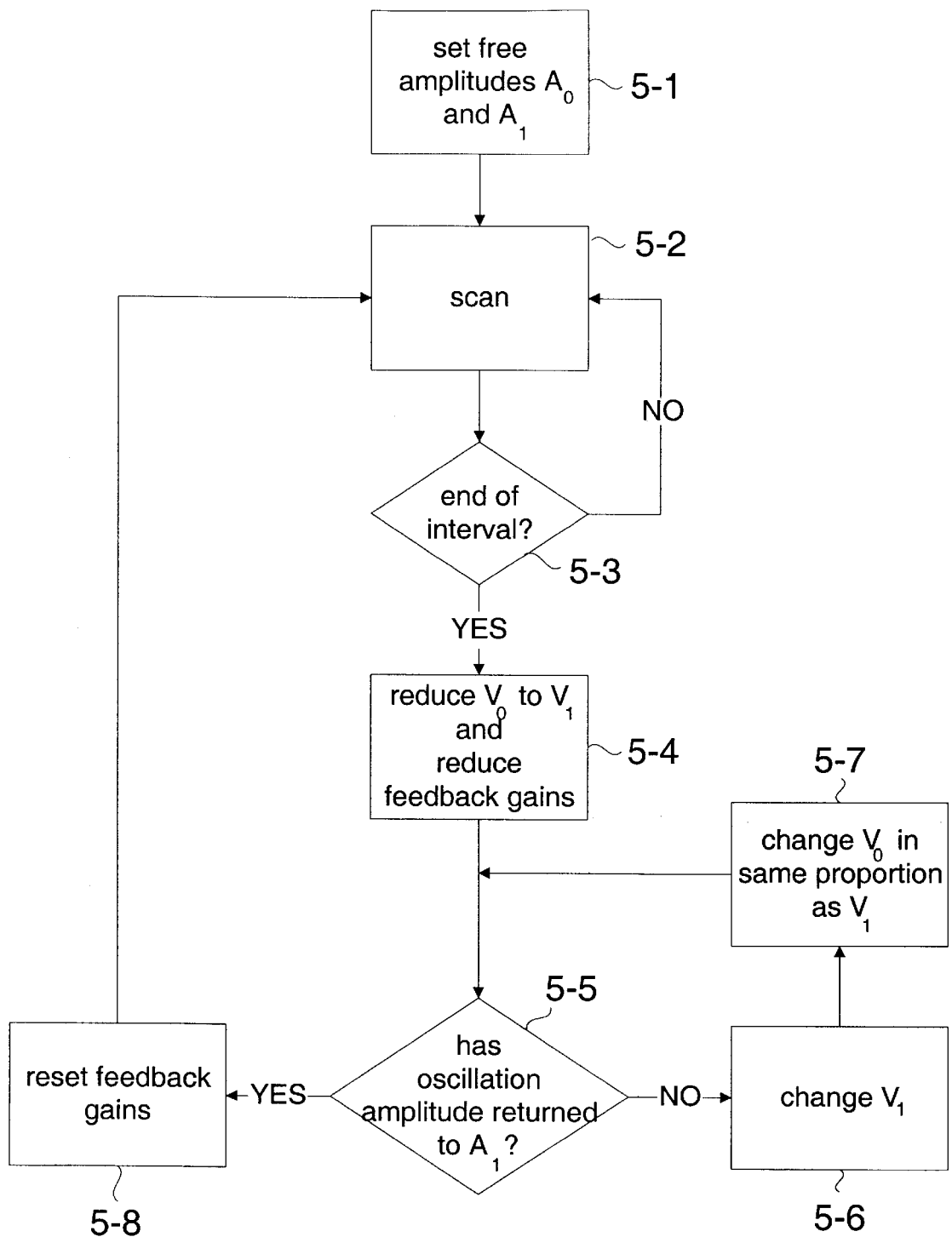
FIG. 5 is a flow chart representing another embodiment of the invention as applied to a scanning procedure.

For instance, referring to FIG. 5, another option is to set two free amplitudes in Step 5-1, namely: $A_0$, which is the intended operating amplitude; and $A_1$, which is less than $A_0$. $A_0$ corresponds to a probe drive signal amplitude $V_0$, and $A_1$ corresponds to a drive signal amplitude $V_1$, where $V_1<V_0$. During scanning (step 5-2), at selected intervals (step 5-3), $V_0$ could be reduced to $V_1$ (step 5-4), while simultaneously reducing the feedback gains so that the probe 3 no longer remains in intermittent contact with the sample surface (step 5-4). Thus, the measured oscillation amplitude should return to $A_1$ (step 5-5). Any change from Al could be corrected by changing $V_1$ (step 5-6), and then changing $V_0$ in the same proportion (step 5-7) to change $A_0$. Then, by resetting the feedback gains or otherwise adjusting an operational parameter of the probe 3 to reestablish oscillatory measurement (step 5-8), the AFM will cause the probe 3 to return to oscillatory measurement with the drive voltage appropriately corrected (step 5-9). This mode has the advantage of smoother, more continuous vertical scan motions compared to lifting and lowering the probe 3.

For both the scanning and approach methods of applying the first embodiment of the invention, it is possible to substitute a signal corresponding to the phase shifts in the probe oscillation relative to the tip oscillator for the probe oscillation amplitude signal to provide feedback for measurement and/or control of the oscillation parameters. Thus, such a phase signal or derivative thereof can provide sufficient information to perform the correction of the oscillation parameters of the first embodiment.

However, in the second embodiment, a phase signal that provides the necessary information can also be obtained during scanning, and therefore the probe does not need to be taken out of intermittent contact to perform corrections to the oscillation parameters. As discussed in co-pending U.S. patent application Ser. No. 08/898469 "Method and Apparatus for Measuring Energy Dissipation by a Probe During Operation of an Atomic Force Microscope" by Jason Cleveland, Jul. 22, 1997 ("the Cleveland application"), phase may be measured by placing the probe in an operative position in which it is in oscillatory interaction with the sample, and measuring a phase shift of the probe free end relative to the tip oscillator and generating a phase signal indicative thereof. The Cleveland application then describes combining the phase and amplitude signals and generating a dissipation signal indicative of energy dissipated due to interaction between the probe and the sample. That dissipation signal can then be stored, displayed, and/or combined with other signals and used in additional calculations.

Thus, using the phase signal or the dissipation signal derived from it, a preferred method to operate in the light Tapping mode would be to use feedback to keep the Tapping amplitude at $A_s$ and to keep the phase or energy dissipation constant by varying the AC drive strength to the cantilever oscillator, or other oscillation parameters. This process would continually correct for drifts in the system, such as changes in $A_o$, which would in turn change the energy dissipation during scanning.

It is known that at a constant $A_s$ on a composite sample, i.e., a sample with two or more components or forms of a component, the phase and energy dissipation will often vary on the different components. Therefore, one may want to average the measurement of the phase or energy dissipation over several data points, scan lines or a whole image before any adjustments would be made to the drive strength.

In another embodiment, the invention could be used to control the energy dissipation per tap more accurately than is otherwise possible, and thereby assist in measurements and/or sample modification to be performed with an AFM that depends on such control.

It should be noted that the accuracy of the phase measurement (and therefore the energy dissipation measurement as well) corresponds directly to the accuracy with which the natural resonant frequency of the probe and other parameters are known. As discussed above, one or more of these values may change during a scanning operation. Hence, while it is conceivable that these parameters could be measured only once at the beginning of a scanning operation or even determined prior to a scanning operation and prestored in the memory of the AFM computer, it is preferred that the measurement be performed during the scanning operation at regular intervals so that any changes in the natural resonant frequency of the probe, and/or other parameters, can be detected. For the reasons discussed above in reference to checking the free oscillation amplitude, a logical period for this measurement is once per scan line, but may be as often as once per data point or an average may be taken over several scan lines or images. One way to adjust the frequency back to resonance or to some selected point near resonance is to measure the phase of the tip relative to the oscillator during scanning and adjust it back to its initial value if necessary. For instance, at resonance the phase would lag the oscillator by 90°, and for a desired level of energy dissipation, e.g. light Tapping, the lag would typically be somewhat greater than 90°.

Figure 6:
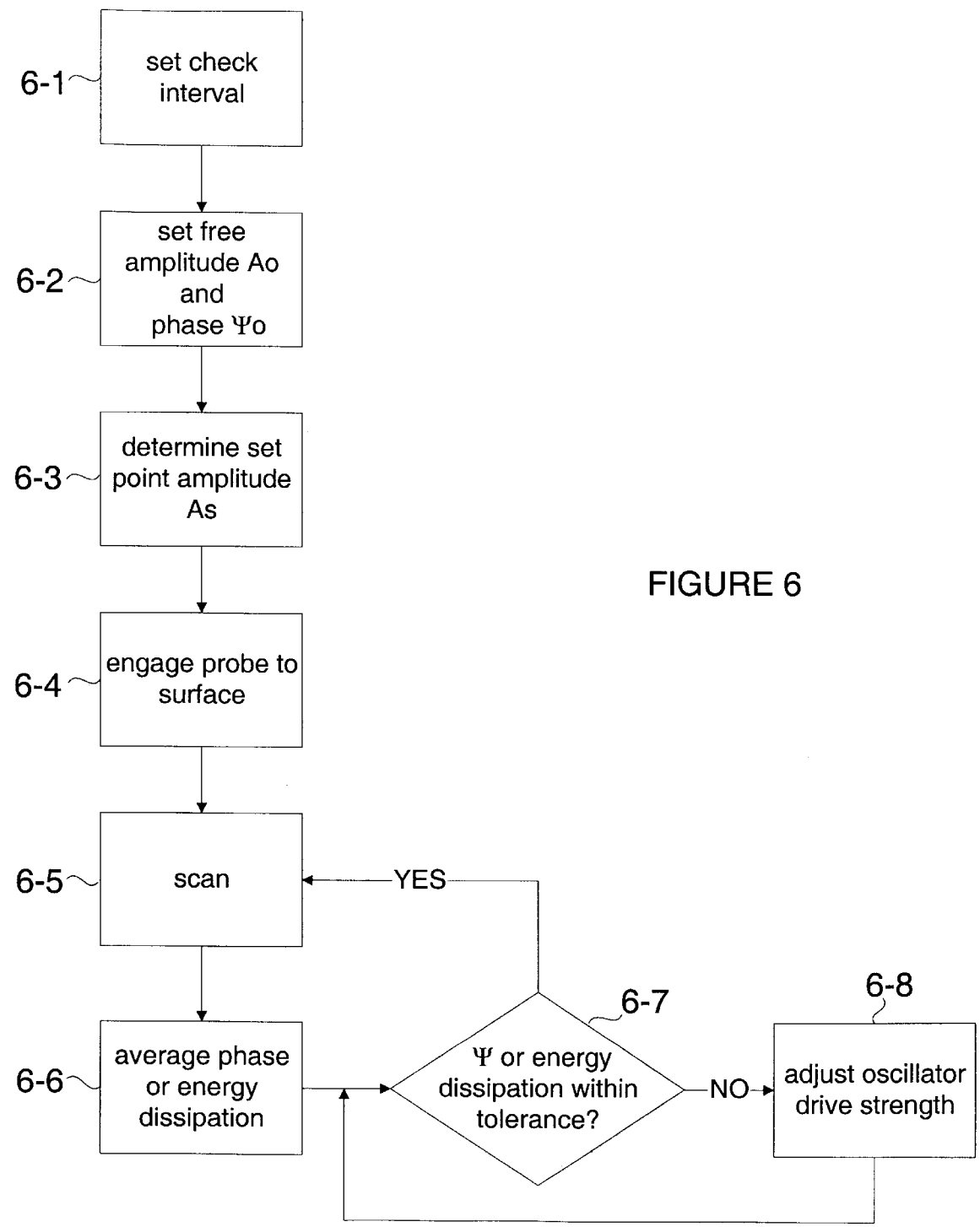
FIG. 6 is a flow chart representing an embodiment of the invention as applied to a scanning procedure employing a measurement of phase.

A preferred technique for controlling oscillation using phase adjustment now will be detailed with reference to FIGS. 1 and 2 and to the flow chart of FIG. 6. After the operator has selected the oscillation parameters as well as the other parameters (steps 6-1 through 6-3), the operator directs the AFM to engage the probe 3, preferably using the computer 7 to transmit the desired command signals. This action consists of the probe 3 being made to approach the sample surface, using the actuator 8 or any other suitable device known to those skilled in the art, until the oscillation amplitude decreases from $A_o$ to $A_s$ (step 6-4). Scanning or measurement of the surface commences at this point (step 6-5), usually by driving the probe 3 laterally across the surface of the sample 5 in a raster-scan pattern and by using $A_s$ as feedback control for the XYZ actuator 8.

Over some predetermined interval of scanning, the phase or derivative thereof, such as energy dissipation, is preferably averaged and compared with a desired value to maintain the average phase, or a parameter derived from the phase, at a constant value. Thus, while still scanning, the phase or energy dissipation between the probe tip 6 and the oscillator 2 is detected using a detector such as a displacement sensor 4. Then, in step 6-6, the phase or energy dissipation is typically, though not necessarily, averaged over a desired number of data points, potentially including several scan lines or even several images. It is important to note that an average will typically be taken in order to account for changes in the phase signal due to variability in the sample, as discussed above. The phase $\Psi$ or the energy dissipation is then checked to make certain it is within predefined tolerances (step 6-7). If it is not within the tolerances, the oscillator 2 drive strength is then adjusted without interrupting the scanning operation to correct the error (step 6-8). If the phase or energy dissipation is within the predefined tolerance, scanning continues unchanged (returns to step 6-5).

The benefit of the invention has been to achieve much more reliable light Tapping performance, as well as greater accuracy at other levels of tip-sample interaction.

Many changes and modifications may be made to the invention without departing from the spirit thereof. The scope of some of these changes has already been discussed. The scope of others will become apparent from the attached claims.

We claim:

1. A method of maintaining stable interaction between a probe and a sample during oscillatory operation of an atomic force microscope, said method comprising:
   (A) placing said probe in an operative state in which said probe interacts with said sample while said probe oscillates;
   (B) placing said probe in a free oscillation state; then
   (C) measuring a parameter of probe free oscillation and determining whether or not the measured magnitude of the parameter of probe free oscillation differs from a desired magnitude of the parameter of probe free oscillation; and then
   (D) adjusting at least one parameter of probe oscillation if the measured magnitude of the parameter of probe free oscillation differs from the desired magnitude of the parameter of probe free oscillation.

2. A method as defined in claim 1, wherein the parameter of probe free oscillation which is measured is a free oscillation amplitude of a tip of said probe.

3. A method as defined in claim 2, wherein a parameter of probe oscillation which is adjusted is the free oscillation amplitude of said probe tip.

4. A method as defined in claim 2, wherein a parameter of probe oscillation which is adjusted is the drive frequency of said probe tip.

5. A method as defined in claim 2, wherein a parameter of probe oscillation which is adjusted is the drive amplitude of said probe tip.

6. A method as defined in claim 2, wherein said probe tip oscillates at an operative oscillation amplitude when said probe is in the operative state, and wherein the step of placing said probe in the free oscillation state comprises moving an element comprising at least one of said probe and said sample to a reference position in which said probe oscillates in the free oscillation state.

7. A method as defined in claim 6, further comprising, following the adjusting step, moving said element back to a position in which said probe oscillates in the operative state and wherein a parameter of probe oscillation which is adjusted is an oscillation amplitude of said probe tip occurring when said probe oscillates in the operative state.

8. A method as defined in claim 6, further comprising, following the adjusting step, moving said element back to a position in which said probe oscillates in the operative state, and wherein a parameter of probe oscillation which is adjusted is the drive frequency to said probe tip occurring when said probe oscillates in the operative state.

9. A method as defined in claim 6, further comprising, following the adjusting step, moving said element back to a position in which said probe oscillates in the operative state, and wherein a parameter of probe oscillation which is adjusted is a drive amplitude to said probe tip occurring when said probe oscillates in the operative state.

10. A method as defined in claim 7, wherein at least one of the operative oscillation amplitude and the free oscillation amplitude is adjusted, and wherein the adjusting step maintains the operative oscillation amplitude within a desired percentage of the free oscillation amplitude.

11. A method as defined in claim 10, wherein the desired percentage is greater than 90%.

12. A method as defined in claim 6, wherein said probe is located in a near-scanning position just above a scanning position when said probe tip oscillates at the operative oscillation amplitude, and wherein the reference position is located above the near-scanning position.

13. A method as defined in claim 12, further comprising driving said probe to move into the scanning position following the adjusting step.

14. A method as defined in claim 6, wherein the reference position is one in which the probe oscillation is affected by indirect probe-sample interaction.

15. A method as defined in claim 6, wherein the reference position is one in which the probe oscillation is not affected by indirect probe-sample interaction.

16. A method as defined in claim 2, further comprising driving said probe tip to oscillate at the free oscillation amplitude prior to the step of placing said probe in the operative state.

17. A method as defined in claim 1, wherein
   said probe tip oscillates at a first amplitude $A_o$ when said probe is driven at a first drive signal amplitude $V_o$, wherein
   the step of placing said probe in the free oscillation state comprises driving said probe at a second drive signal amplitude $V_1$ which is less than said first drive signal amplitude $V_o$ and simultaneously allowing said probe to cease intermittent contact with said sample and begins to oscillate in the free oscillation state at a probe tip amplitude $A_1$, wherein
   the determining step comprises determining whether or not the measured free oscillation amplitude differs from the desired free oscillation amplitude, and wherein
   the adjusting step comprises adjusting the second drive signal amplitude $V_1$ and then changing the first drive signal amplitude $V_o$ in the same proportion that the second drive signal amplitude $V_1$ is changed while adjusting an operational parameter of said probe so as to allow said probe to return to the operative state.

18. A method as defined in claim 1, further comprising repeating the steps (A) through (D) at intervals.

19. A method as defined in claim 18 where the interval is at least one scan line.

20. A method as defined in claim 1, wherein the free oscillation state is one in which the probe oscillation is affected by indirect probe-sample interaction.

21. A method as defined in claim 1, wherein the free oscillation state is one in which the probe oscillation is not affected by indirect probe-sample interaction.

22. A method of maintaining stable interaction between a probe tip of a probe and a sample during a scanning operation of an atomic force microscope, said method comprising:
   (A) driving said probe to oscillate so that said probe tip oscillates at a desired free oscillation amplitude $A_o$; then
   (B) while said probe is oscillating, moving an element comprising at least one of said probe and said sample into a scanning position in which the oscillation amplitude of said probe tip decreases to a desired amplitude $A_s$ due to direct interaction with said sample, then
   (C) at intervals and while said probe is oscillating,
      (1) interrupting the scanning operation by causing said probe to oscillate without direct interaction with said sample, then
      (2) measuring the free oscillation amplitude of said probe tip and determining whether or not the measured free oscillation amplitude differs from a target free oscillation amplitude, and then
      (3) if the measured free oscillation amplitude differs from the target free oscillation amplitude, adjusting the free oscillation amplitude so that the free oscillation amplitude at least approaches the target free oscillation amplitude, and then
      (4) resuming the scanning operation.

23. A method as defined in claim 22, wherein
the interrupting step comprises moving said element to a reference position in which said probe oscillates without direct interaction with said sample, wherein
the target free oscillation amplitude is the desired free oscillation amplitude $A_o$, and wherein
the step of resuming the scanning operation comprises moving said element back to the scanning position.

24. A method as defined in claim 22, wherein
the step of driving said probe tip to oscillate at the desired free oscillation $A_o$ amplitude comprises transmitting a first drive signal of amplitude $V_o$ to said probe,
the interrupting step comprises reducing the drive signal to a second drive signal amplitude $V_1$ which is less than the first drive signal amplitude $V_o$ and simultaneously reducing feedback gains so that said probe tip oscillates at a free oscillation amplitude which is measured during the measuring step, wherein
the target free oscillation amplitude is a free oscillation amplitude $A_1$ which is less than the free oscillation amplitude $A_o$, wherein
the determining step comprises determining whether or not the measured free oscillation amplitude differs from the free oscillation amplitude $A_1$, wherein
the adjusting step comprises adjusting the second drive signal amplitude $V_1$ and then adjusting the first drive signal amplitude $V_o$ in the same proportion that the second drive signal amplitude $V_1$ is changed, and wherein
the step of resuming the scanning operation comprises transmitting the adjusted first drive signal amplitude $V_o$ to said probe and returning said probe to an operative state.

25. A method of maintaining stable interaction between a probe tip of a probe and a sample during a scanning operation of an atomic force microscope, said method comprising:
(A) driving said probe to oscillate so that said probe tip oscillates at a desired free oscillation amplitude $A_o$; then
(B) while said probe is oscillating, moving an element comprising at least one of said probe and said sample into a scanning position in which the oscillation amplitude of said probe tip decreases to a desired scanning amplitude $A_1$ due to direct interaction with said sample, thereby initiating the scanning operation; then
(C) at intervals and while said probe is oscillating,
  (1) interrupting the scanning operation by moving said element to a reference position in which said probe oscillates without direct interaction with said sample, then
  (2) while said probe is in the reference position, measuring the free oscillation amplitude of said probe tip and determining whether or not the measured free oscillation amplitude differs from the desired free oscillation amplitude $A_o$, then
  (3) if the measured free oscillation amplitude differs from the desired free oscillation amplitude $A_o$, adjusting the free oscillation amplitude so that the free oscillation amplitude at least approaches the desired free oscillation amplitude $A_o$, and then
  (4) moving said element back to the scanning position and resuming the scanning operation.

26. A method as defined in claim 25, wherein the adjusting step maintains the scanning oscillation amplitude within a desired percentage of the desired free oscillation amplitude.

27. A method as defined in claim 25, wherein the desired percentage is greater than 90%.

28. A method as defined in claim 25, wherein the desired percentage is greater than 95%.

29. A method as defined in claim 25, wherein a base of said probe is displaced no more than about 100 nanometers during the interrupting step.

30. A method as defined in claim 29, wherein said base of said probe is displaced no more than about 10 nanometers during the interrupting step.

31. A method as defined in claim 25, wherein said probe scans along lines of a predetermined length during the scanning operation to produce scanlines, and wherein said interrupting step takes place at least once per scanline.

32. A method as defined in claim 25, wherein said adjusting step comprises adjusting power input to an oscillator that drives said probe to oscillate.

33. A method as defined in claim 25, wherein said adjusting step comprises adjusting frequency input to an oscillator that drives said probe to oscillate.

34. A method of maintaining stable interaction between a probe tip of a probe and a sample during an approach operation of an atomic force microscope that takes place in preparation for a scanning operation, said method comprising:
(A) while said probe is at an initial position spaced from said sample, driving said probe to oscillate so that said probe tip oscillates at a desired free oscillation amplitude $A_o$; then
(B) while said probe is oscillating, performing the approach operation by moving said probe towards said sample and into an approach position in which said probe tip oscillates at an amplitude intermediate the desired free oscillation amplitude $A_o$ and a desired scanning amplitude $A_s$ at which said probe tip is intended to operate when said probe is in a scanning position; then
(C) while said probe is oscillating,
  (1) interrupting the approach operation by moving said probe away from said sample to a reference position in which said probe oscillates without directly interacting with said sample, then
  (2) while said probe is in the reference position, measuring the free oscillation amplitude of said probe tip and determining whether or not the measured free oscillation amplitude differs from the desired free oscillation amplitude $A_o$, and then
  (3) if the measured free oscillation amplitude differs from the desired free oscillation amplitude $A_o$, adjusting the free oscillation amplitude so that the free oscillation amplitude at least approaches the desired free oscillation amplitude $A_o$, and then
  (4) moving said probe back to and through the approach position.

35. A method as defined in claim 34, wherein the reference position is located close enough to a surface of said sample that the free oscillation amplitude is affected by proximity to said surface.

36. A method of maintaining stable interaction between a probe tip of a probe and a sample during a scanning operation of an atomic force microscope, said method comprising:
(A) transmitting a first drive signal of amplitude $V_o$ to said probe to drive said probe tip at a desired free oscillation amplitude $A_o$; then
(B) while said probe is oscillating, moving said probe towards said sample and into a scanning position in which the oscillation amplitude of said probe tip decreases to a desired scanning amplitude $A_s$ due to direct interaction with said sample, thereby initiating the scanning operation; then (C) at intervals and while said probe is oscillating,
  (1) interrupting the scanning operation by reducing the drive signal to a second drive signal amplitude $V_1$ which is less than the first drive signal amplitude $V_o$ and simultaneously reducing feedback gains to attempt to cause said probe tip to oscillate at a free oscillation amplitude $A_1$, then
  (2) measuring the free oscillation amplitude of said probe tip and determining whether or not the measured free oscillation amplitude differs from the free oscillation amplitude $A_1$, then
  (3) if the measured free oscillation amplitude differs from the free oscillation amplitude $A_1$, then adjusting the second drive signal amplitude $V_1$ and then adjusting the first drive signal amplitude $V_o$ in the same proportion that the second drive signal amplitude $V_1$ is adjusted, and then
  (4) resuming the scanning operation by transmitting the adjusted first drive signal amplitude $V_o$ to said probe and adjusting an operational parameter of said probe so as to allow said probe to return to an operative state.

37. An atomic force microscope comprising:
(A) a probe;
(B) an oscillator which drives said probe to oscillate;
(C) an actuator which drives an element comprising at least one of said probe and a sample to vary a probe-sample spacing;
(D) a detector which detects the magnitude of at least one parameter of probe tip oscillation; and
(E) a controller which is coupled to said oscillator, said actuator, and said detector and which is operable, using signals from said detector, to control operation of at least one of said oscillator and said actuator to at least essentially eliminate deviations in at least one parameter of probe oscillation caused by factors other than a measuring interaction between said probe and a sample, thereby maintaining a stable interaction between said probe and the sample.

38. An apparatus as defined in claim 37, wherein
said controller selectively drives said oscillator to cause said probe to oscillate so that a tip of said probe oscillates at a desired free oscillation amplitude $A_o$, wherein
said controller selectively drives said actuator to move said element into a scanning position in which the oscillation amplitude of said probe tip decreases to a desired scanning amplitude $A_s$ due to interaction with the sample, thereby initiating a scanning operation, and wherein
said controller is operable, at intervals and while said probe is oscillating,
  (1) to control said at least one of said oscillator and said actuator to interrupt the scanning operation by causing said probe to oscillate without directly interacting with the sample,
  (2) to determine, based upon signals received from said detector when said probe is oscillating freely, whether or not a measured free oscillation amplitude of said probe tip differs from a target free oscillation amplitude of said probe tip,
  (3) if the measured free oscillation amplitude differs from the target free oscillation amplitude, to cause said oscillator to adjust the free oscillation amplitude so that the free oscillation amplitude at least approaches the target free oscillation amplitude, and
  (4) to drive at least one of said oscillator and said actuator to resume the scanning operation.

39. An apparatus as defined in claim 37, wherein
said controller selectively drives said oscillator to cause said probe to oscillate so that a tip of said probe oscillates at a desired free oscillation amplitude $A_o$,
said controller selectively drives said actuator to move said element into a scanning position in which the oscillation amplitude of said probe tip decreases to a desired scanning amplitude $A_s$ due to direct interaction with the sample, thereby initiating a scanning operation, and wherein
said controller is operable, at intervals and while said probe is oscillating,
  (1) to interrupt the scanning operation by driving said actuator to move said element to a reference position in which said probe oscillates freely,
  (2) based upon signals received from said detector when said probe is in said reference position, to determine whether or not the measured free oscillation amplitude differs from the desired free oscillation amplitude $A_o$,
  (3) if the measured free oscillation amplitude differs from the desired free oscillation amplitude $A_o$, to drive said oscillator to adjust the free oscillation amplitude so that the free oscillation amplitude at least approaches the desired free oscillation amplitude $A_o$, and
  (4) to subsequently drive said actuator to move said element back to the scanning position and resume the scanning operation.

40. An apparatus as defined in claim 37, wherein
said controller selectively transmits a drive signal to said oscillator of a first a drive signal amplitude $V_o$ to cause said probe to oscillate so that a tip of said probe oscillates at a first desired free oscillation amplitude $A_o$,
said controller selectively drives said actuator to move said probe towards the sample and into a scanning position in which the oscillation amplitude of said probe tip decreases to a desired scanning amplitude $A_s$ due to interaction with the sample, thereby initiating a scanning operation, and wherein
said controller is operable, at intervals and while said probe is oscillating,
  (1) to interrupt the scanning operation by reducing the drive signal transmitted to said oscillator to a second drive signal amplitude $V_1$ which is less than the first drive signal amplitude $V_o$ while simultaneously reducing feedback gains to attempt to cause said probe tip to oscillate at a second free oscillation amplitude $A_1$,
  (2) in response to signals received from said detector, to determine whether or not a measured free oscillation amplitude differs from the second free oscillation amplitude $A_1$,
  (3) if the measured free oscillation amplitude differs from the second free oscillation amplitude $A_1$, to drive the oscillator with an adjusted second signal amplitude $V_1$, and then
  (4) to resume the scanning operation after an adjustment procedure by transmitting an adjusted first drive signal amplitude $V_o$ to said probe while simultaneously increasing feedback gains, wherein the adjusted first drive signal amplitude $V_o$ is adjusted in the same proportion that the second drive signal amplitude $V_1$ is adjusted.

41. An apparatus as defined in claim 37, wherein said controller selectively drives said oscillator to cause said probe tip to oscillate at a desired free oscillation amplitude $A_o$, wherein said controller selectively drives said actuator to move said element into an approach position in which said probe tip oscillates at an amplitude intermediate the desired free oscillation amplitude $A_o$ and a desired scanning amplitude $A_s$ at which said probe tip is intended to operate when said probe is in a scanning position, and wherein said controller is operable, while said probe is oscillating,
(1) to interrupt the approach operation by driving said actuator to move said element to a reference position in which said probe oscillates freely,
(2) in response from signals received from said detector while said probe is in said reference position, to determine whether or not the measured free oscillation amplitude differs from the desired free oscillation amplitude $A_o$, and
(3) if the measured free oscillation amplitude differs from the desired free oscillation amplitude $A_o$, to drive said oscillator to adjust the free oscillation amplitude so that the free oscillation amplitude at least approaches the desired free oscillation amplitude $A_o$, and
(4) to drive said actuator to move said element back to the approach position after an adjustment procedure.

42. An atomic force microscope comprising:
(A) a probe;
(B) a driver which drives said probe to move;
(C) a detector which detects the magnitude of at least one parameter of probe oscillation; and
(D) a controller which is coupled to said driver and said detector and which is operable, using signals from said detector, to control operation of said driver to at least essentially eliminate deviations in at least one parameter of probe oscillation caused by factors other than a measuring interaction between said probe and a sample, thereby maintaining a stable interaction between said probe and the sample.

43. An atomic force microscope as defined in claim 42, wherein said driver includes (1) an oscillator which imparts oscillatory motion to said probe and (2) an actuator which drives an element comprising at least one of said probe and a sample to vary a probe-sample spacing.

44. An atomic force microscope comprising:
(A) a probe;
(B) an oscillator which drives said probe to oscillate;
(C) a detector which detects a parameter of probe oscillation indicative of energy dissipated by said probe when said probe is in an operative state in which it interacts with a sample; and
(D) a controller which is coupled to said oscillator and to said detector and which adjusts operation of said oscillator, while said probe is in the operative state, to maintain the energy dissipated by said probe generally constant and to maintain the oscillation amplitude of said probe substantially constant.

45. An atomic force microscope as defined in claim 44, wherein said detector detects a phase of probe oscillation relative to a phase of oscillator oscillation.

46. A method of maintaining stable interaction between a probe and a sample during oscillatory operation of an atomic force microscope, said method comprising:
(A) placing said probe in an operative state in which said probe interacts with said sample while said probe oscillates;
(B) while said probe is in the operative state, measuring a parameter of probe oscillation which is indicative of energy dissipated by said probe; and
(C) while said probe is in the operative state, adjusting at least one parameter of probe oscillation if the measured magnitude of the parameter of probe oscillation differs from a desired magnitude of the parameter of probe oscillation, wherein the adjusting step at least substantially eliminates deviations in at least one parameter of probe oscillation caused by factors other than a measuring interaction between said probe and the sample.

47. A method of maintaining stable interaction between a probe and a sample during oscillatory operation of an atomic force microscope, said method comprising:
(A) placing said probe in an operative state in which said probe interacts with said sample while said probe oscillates;
(B) while said probe is in the operative state, measuring a parameter of probe oscillation which is indicative of energy dissipated by said probe; and
(C) while said probe is in the operative state, adjusting a phase of probe oscillation if the measured magnitude of the phase of probe oscillation differs from a desired magnitude of the phase of probe oscillation, wherein the measuring step comprises measuring the phase of said probe relative to a phase of an oscillator which drives said probe to oscillate, and wherein the adjusting step comprises adjusting operation of said oscillator.

48. A method as defined in claim 46, wherein the measuring step comprises averaging measurements taken over a plurality of data points.

49. A method as defined in claim 48, wherein the measuring step comprises averaging measurements taken during at least one scan line.

50. A method as defined in claim 46, wherein an amplitude of probe oscillation remains constant during the measuring and adjusting steps.

51. An atomic force microscope as defined in claim 37, wherein said controller is operable, using signals from said detector, to control operation of at least one of said oscillator and said actuator to at least essentially eliminate deviations in at least one parameter of probe oscillation caused by a measuring interaction between said probe and the sample, thereby generating data indicative of a surface characteristic of the sample.

52. An atomic force microscope as defined in claim 51, wherein said controller is operable to at least substantially eliminate deviations in probe oscillation amplitude caused by the measuring interaction between said probe and the sample.

53. An atomic force microscope as defined in claim 42, wherein said controller is operable, using signals from said detector, to control operation of said driver to at least essentially eliminate deviations in at least one parameter of probe oscillation caused by a measuring interaction between said probe and the sample, thereby generating data indicative of a surface characteristic of the sample.

54. An atomic force microscope as defined in claim 53, wherein said controller is operable to at least substantially eliminate deviations in probe oscillation amplitude caused by the measuring interaction between said probe and the sample.

55. An atomic force microscope as defined in claim 46, wherein said controller is operable, using signals from said detector, to control operation of said driver to at least essentially eliminate deviations in at least one parameter of probe oscillation caused by a measuring interaction between said probe and the sample, thereby generating data indicative of a surface characteristic of the sample.

56. An atomic force microscope as defined in claim 55, wherein said controller is operable to at least substantially eliminate deviations in probe oscillation amplitude caused by the measuring interaction between said probe and the sample.

57. A method as defined in claim 46, further comprising controlling at least one parameter of probe oscillation to at least essentially eliminate deviations thereof caused by a measuring interaction between said probe and the sample, thereby generating data indicative of a surface characteristic of the sample.

58. A method as defined in claim 57, wherein the controlling step comprises at least essentially eliminating deviations in probe oscillation amplitude caused by the measuring interaction between said probe and the sample.

* * * * *